United States Patent Office 2,990,406
Patented June 27, 1961

2,990,406
NITROALKYL PIPERAZINES
Lawrence R. Jones, Terre Haute, Ind., assignor to Commercial Solvents Corporation, New York, N.Y., a corporation of Maryland
No Drawing. Filed May 27, 1959, Ser. No. 816,063
5 Claims. (Cl. 260—268)

My invention relates to nitroalkyl piperazines having the following structural formula

where R is a member selected from the group consisting of hydroxymethyl and piperazinoalkyl and $R_1$ is piperazinomethyl.

I have found that compounds of my invention are prepared by the reaction of tris(hydroxymethyl)nitromethane with piperazino in mole ratios of nitroalcohol to piperazine of from 1 to 3 to 1 to 1. The compounds which come within the scope of my invention are: tris-(piperazinomethyl)nitromethane, 2-nitro-2-hydroxymethyl-1,3 - dipiperazinopropane, 2-nitro-2-piperazinomethyl-1,3-propanediol.

I can prepare the nitroalkyl piperazines of my invention by any suitable means. I prefer, however, to prepare them in the presence of a solvent. Any solvent which is essentially inert to the reactants and the compounds of my invention is suitable. Examples of such solvents include water, the lower molecular weight alcohols, such as methanol, ethanol and butanol, and the lower molecular weight ketones, such as acetone and methylethyl ketone, etc.

Analysis of the mechanism of the reaction which produces the compounds of my invention indicates that piperazine condenses with one or more of the hydroxyl groupings of the nitroalcohol with which it reacts. When the reactants are combined in mole ratios of one to one, condensation will take place on only one of the hydroxyl groupings. If, however, the mole ratio of piperazine to nitrodiol or nitrotriol is more than one to one, condensation will take place on more than one hydroxyl grouping. Therefore, when more than one hydroxyl grouping is present, products of differing structures can be formed merely by varying the mole ratios of the nitroalcohols and piperazine. For example, the reaction of three moles of piperazine with one mole of tris(hydroxymethyl)nitromethane yields tris(piperazinomethyl)nitromethane. When two moles of piperazine are reacted with one mole of tris(hydroxymethyl)nitromethane, 2-nitro-2-hydroxymethyl-1,3-dipiperazinopropane is produced.

I have found the nitroalkyl piperazines of my invention to be useful as plasticizers for nitrocellulose and vinyl coating compositions. I have also found my new compounds to have physiological activity.

The following examples serve to illustrate my invention. However, I do not intend to be limited to the specific materials, proportions, compounds or procedures set forth therein. Rather, I intend to include within the scope of my invention all equivalents obvious to those skilled in the art.

Example I

To a suitable container containing 15.11 g. of tris(hydroxymethyl)nitromethane in 50 mls. of water was added 17.25 g. of piperazine dissolved in 50 mls. of water. The resulting mixture was heated to 50–60° C. and agitated until a uniform mixture was formed. The mixture was allowed to cool to room temperature and then was allowed to stand for one hour. The solid formed during the reaction was removed by filtration and dried. The white crystalline 2-nitro-2-hydroxymethyl-1,3-dipiperazinopropane had a molecular weight of 287.36.

Example II

Following the procedure of Example I, tris(hydroxymethyl)nitromethane was reacted in mole ratios of 1:3 with piperazine to yield white crystalline tris(piperazinomethyl)nitromethane. M.W. 355.48.

Example III

Following the procedure of Example I, tris(hydroxymethyl)nitromethane was reacted in mole ratios of 1:1 with piperazine to yield white crystalline 2-nitro-2-piperazinomethyl-1,3-propane-diol. M.W. 219.24.

Now having described my invention, what I claim is:
1. Tris(piperazinomethyl)nitromethane.
2. 2-Nitro-2-hydroxymethyl-1,3-dipiperazinopropane.
3. 2-Nitro-2-piperazinomethyl-1,3-propanediol.
4. A compound having the following structural formula:

where R is a member selected from the group consisting of hydroxymethyl and piperazinomethyl and $R_1$ is piperazinomethyl.

5. A process for the preparation of a compound having the formula:

where R is selected from the group consisting of hydroxymethyl and piperazinomethyl and $R_1$ is piperazinomethyl which comprises reacting tris(hydroxymethyl)nitromethane with piperazine in a molar ratio of tris(hydroxymethyl)nitromethane to piperazine ranging from 1 to 3 to 1 to 1.

References Cited in the file of this patent
UNITED STATES PATENTS

| | | |
|---|---|---|
| 2,474,791 | Senkus | June 28, 1949 |
| 2,684,368 | Leonard | July 20, 1954 |